US009156120B2

(12) United States Patent
Kosonen et al.

(10) Patent No.: US 9,156,120 B2
(45) Date of Patent: Oct. 13, 2015

(54) MACHINING TOOL

(71) Applicant: JOT Automation Oy, Kempele (FI)

(72) Inventors: Petri Kosonen, Lohja (FI); Taavi Kirsimagi, Tallinn (EE); Pertti Sipila, Oulu (FI)

(73) Assignee: JOT AUTOMATION OY, Kempele (FI)

( * ) Notice: Subject to any disclaimer, the term of this patent is extended or adjusted under 35 U.S.C. 154(b) by 0 days.

(21) Appl. No.: 14/172,487

(22) Filed: Feb. 4, 2014

(65) Prior Publication Data

US 2014/0220871 A1  Aug. 7, 2014

(30) Foreign Application Priority Data

Feb. 6, 2013 (EP) ...................................... 13154165

(51) Int. Cl.
*B24B 21/14* (2006.01)
*B24B 21/20* (2006.01)
*B24B 23/06* (2006.01)
(Continued)

(52) U.S. Cl.
CPC ................. *B24B 21/20* (2013.01); *B24B 21/12* (2013.01); *B24B 21/14* (2013.01); *B24B 23/06* (2013.01); *B24B 27/0038* (2013.01); *B24B 41/002* (2013.01); *B24B 45/00* (2013.01); *B24B 47/12* (2013.01); *B25J 11/006* (2013.01); *B25J 11/0065* (2013.01)

(58) Field of Classification Search
CPC ........ B24B 21/12; B24B 21/14; B24B 21/20; B24B 23/06
USPC ........... 451/59, 296, 297, 299, 302, 303, 307, 451/311, 355
See application file for complete search history.

(56) References Cited

U.S. PATENT DOCUMENTS 3,533,192 A * 10/1970 Wezel .......................... 451/311
3,594,959 A *  7/1971 Wezel .......................... 451/355
(Continued)

FOREIGN PATENT DOCUMENTS

DE  102011104010 A1  12/2012
EP       1990133 A2  11/2008
FR       2677289 A1  12/1992

OTHER PUBLICATIONS

European Search Report for corresponding European Application No. EP 13 15 4165, pp. 1-2 (Jul. 2013).
(Continued)

*Primary Examiner* — Eileen Morgan
(74) *Attorney, Agent, or Firm* — Hoffmann & Baron, LLP

(57) ABSTRACT

A machining tool includes a power transmission mechanism, a circular machining belt, a tightening mechanism and a contact mechanism for tool contact with an object to be machined. The power transmission mechanism of the machining tool has a mechanical connection with a rotational power source. The contact mechanism and the power transmission mechanism have a desired distance therebetween. The circular machining belt is looped between the contact mechanism and the power transmission mechanism for causing the circular machining belt to move between the contact mechanism and the power transmission mechanism in response to the rotation of the power transmission mechanism for machining the object. The tightening mechanism is configured to press sections of the circular machining belt between the contact mechanism and power transmission mechanism towards each other.

11 Claims, 3 Drawing Sheets

(51) Int. Cl.
  *B24B 21/12* (2006.01)
  *B24B 27/00* (2006.01)
  *B24B 41/00* (2006.01)
  *B24B 45/00* (2006.01)
  *B24B 47/12* (2006.01)
  *B25J 11/00* (2006.01)

(56) References Cited

U.S. PATENT DOCUMENTS

| | | | |
|---|---|---|---|
| 3,643,385 A * | 2/1972 | Mikiya | 451/355 |
| 4,118,897 A * | 10/1978 | Martin | 451/355 |
| 4,347,689 A * | 9/1982 | Hammond | 451/63 |
| 4,368,597 A * | 1/1983 | Fleckenstein | 451/355 |
| D298,508 S * | 11/1988 | Fukuda et al. | D8/62 |
| 4,930,259 A * | 6/1990 | Kobylenski et al. | 451/303 |
| 4,993,190 A * | 2/1991 | Hiyoshi et al. | 451/307 |
| 5,031,362 A * | 7/1991 | Reiling et al. | 451/355 |
| 5,210,981 A * | 5/1993 | Urda | 451/355 |
| 5,333,414 A * | 8/1994 | Lee | 451/355 |
| 5,643,062 A * | 7/1997 | Joseph et al. | 451/355 |
| 6,425,811 B1 * | 7/2002 | Marks, Jr. | 451/303 |
| 6,893,329 B2 * | 5/2005 | Tajima et al. | 451/41 |
| D508,189 S * | 8/2005 | Murakami | D8/62 |
| 7,364,498 B1 * | 4/2008 | Snyder | 451/296 |
| 8,784,162 B1 * | 7/2014 | Dovel | 451/303 |
| 2010/0105294 A1 * | 4/2010 | Ettinger et al. | 451/44 |
| 2014/0141700 A1 * | 5/2014 | Price | 451/311 |

OTHER PUBLICATIONS

Office Action issued in the European application corresponding to U.S. application 141172,487, Jul. 7, 2015, pp. 1-5. X.

* cited by examiner

MACHINING TOOL

CROSS-REFERENCE TO RELATED APPLICATION

This application claims priority to European Application No. 13154165.8, filed Feb. 6, 2013, which is incorporated by reference herein in its entirety.

BACKGROUND

1. Field

The invention relates to a machining tool.

2. Description of the Related Art

A machining tool such as a belt grinder which is repeatedly connectable to and releasable from a robotic arm has a grinding belt rotating over rollers. One of the rollers is at a tip of a contact arm for bringing the grinding belt in contact with the surface of a machined object. Another roller is a power transmission roller which provides kinetic energy with the grinding belt when it is rotating. The machining tool has also a motor for rotating the power transmission roller. The motor is typically an electric motor or an air motor. Such a robotic machining tool arrangement has problems. For example, opening a mechanical coupling between the machining tool and the robotic arm is not enough for separating the machining tool from the robotic arm but the electric wires or pressure hoses must also be separately released. Correspondingly, after a mechanical coupling between the machining tool and the robotic arm a separate electrical or pneumatic coupling must be made manually which is frustrating and complicated.

Furthermore, the grinding belt must be properly tensioned when it is used for grinding. Similar to coupling and decoupling of the machining tool, the tensioning is also manual work. The grinding belt is tightened by extending the contact arm between the rollers. However, a grinding belt may need tightening several times during use which is impractical and bothersome. It is also a disadvantage that the change in length of the contact arm also changes the location of the grinding contact to the object from the machining tool point of view. That makes it difficult or impossible for the robot to automatically aim the machining tool to a desired place on the machined object which may lower or spoil the quality of the end product.

Hence, there is a need for a better machine tool.

SUMMARY

The following presents a simplified summary of the invention in order to provide a basic understanding of some aspects of the invention. Its purpose is to present some concepts of the invention in a simplified form as a prelude to the more detailed description that is presented later.

An aspect of the invention relates to a claim 1.

It should be appreciated that all combinations of the various embodiments and features of the invention are possible and within the scope of the present invention as claimed.

The present solution provides advantages. The new features in coupling of both the machine tool as such and the machining belt become easier and reduce manual work. Furthermore, the machining belt needs no repetitive tensioning.

BRIEF DESCRIPTION OF THE DRAWINGS

In the following the invention will be described in greater detail by means of exemplary embodiments with reference to the attached drawings, in which.

DETAILED DESCRIPTION

Exemplary embodiments of the present invention will now be described more fully hereinafter with reference to the accompanying drawings, in which some, but not necessarily all embodiments of the invention are shown. Indeed, the invention may be embodied in many different forms and should not be construed as limited to the embodiments set forth herein. Although the specification may refer to "an" embodiment in several locations, this does not necessarily mean that each such reference is to the same embodiment, or that the feature only applies to a single embodiment. A single feature of an embodiment may be combined with one or more features of a different embodiment or different embodiments to provide further embodiments.

Figure 1A:
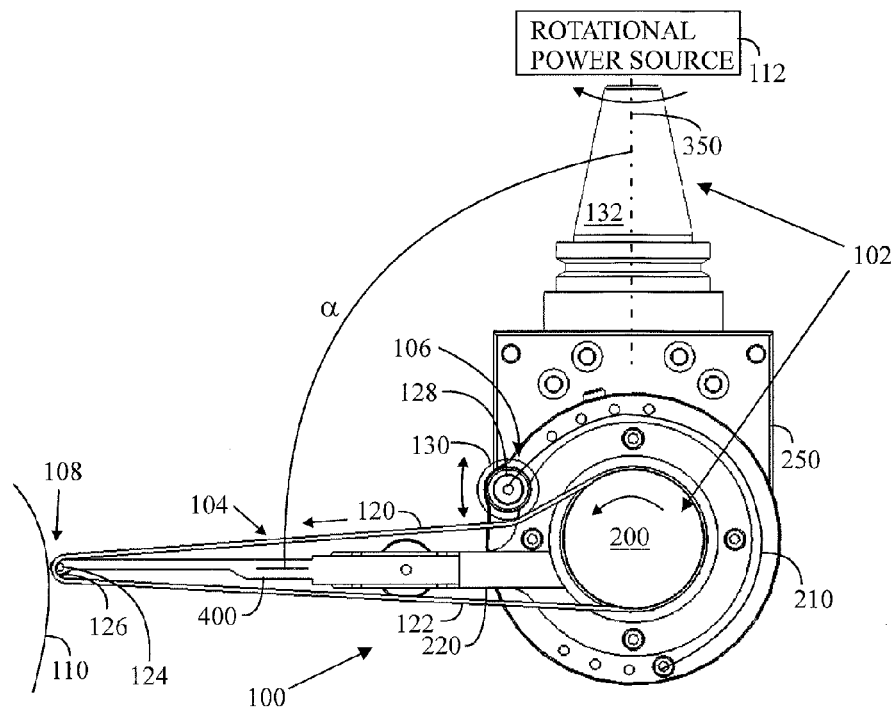
FIG. 1A shows a side view of an example of a machining tool with one spring roller.
Figure 1B:
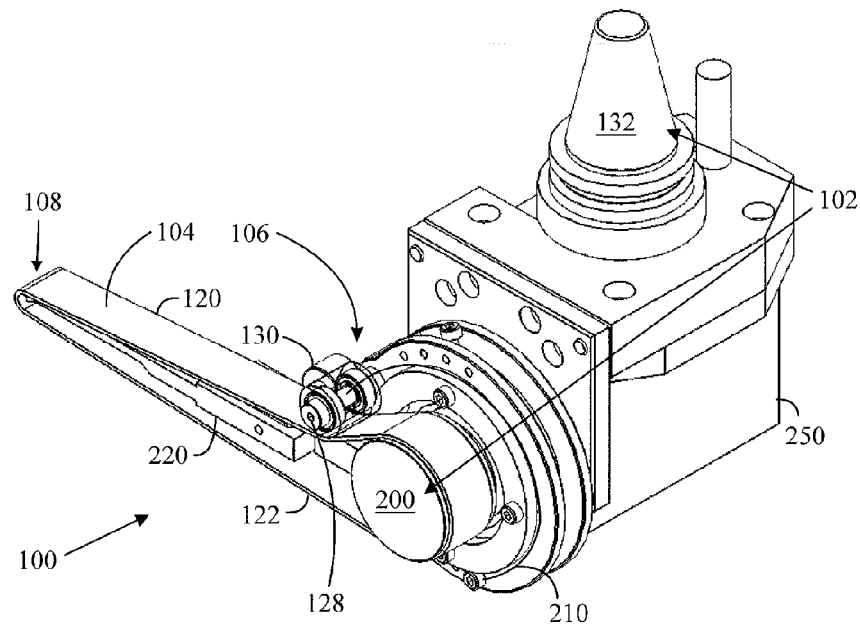
FIG. 1B shows an example of the machining tool from an oblique angle.

FIG. 1A presents a machining tool 100 directly from a side and FIG. 1B presents the machining tool 100 from an oblique direction. The machining tool 100 comprises a power transmission mechanism 102, a circular machining belt 104, a tightening mechanism 106 and a contact mechanism 108. The contact mechanism 108 is used for a tool contact with an object 110 to be machined.

The machining belt 104 is a loop belt without a beginning and an end. A loop has a shape of a round or oval ring and it may be formed from a band of material by turning opposite ends of the band towards each other and fastening the ends together, for example.

The machining tool 100 may be meant for shaping and/or finishing the object 110, for example. The machining tool 100 may be a belt grinder or the like to be used in a robotic arm. Correspondingly, the machining belt 104 may be an abrasive belt, a sanding belt, a grinding belt, a deburring belt, a blending belt, a finishing belt, a polishing belt or the like for removing material from the surface of an object 110. A width of the machining belt 104 may be 1 mm to 50 mm, for example. A length of the machining belt 104 may be 10 mm to 1000 mm (depending on contact arm), for example.

The power transmission mechanism 102 of the machining tool 100 can be mechanically coupled with a rotational power source 112 which may be realized on the basis of a connection part 132. An arrow shows an example of the rotation direction of the connection part 132 which corresponds to that of the rotational power source 112. The direction of rotation may also be altered. The connection part 132 has a shape and structure which fits with the connecting part of the rotational power source 112. The rotational power source 112 may comprise an electric motor or an air motor, for example. The power transmission mechanism 102 may turn the direction of the rotation axis by a desired amount inside the machining tool 100. The turn of the direction of the rotation axis may be 90°, for example.

The contact mechanism 108 and the power transmission mechanism 102 have a structural design capable of receiving and holding the circular machining belt 104 for performing machining with the machining tool 100. The circular machining belt 104 is thus looped between the contact mechanism 108 and the power transmission mechanism 102. The contact mechanism 108 and the power transmission mechanism 102 have a desired distance shorter than about a half of the length of the circular machining belt 104 therebetween in order to enable the use of the circular machining belt 104 for machining. In an embodiment, the contact roller shaft 124 and the power transmission shaft 202 may have a contact arm 220 of a desired length therebetween for realizing the distance of about a half of the circumference of the machining belt 104.

When the machining belt 104 is mounted, the circular machining belt 104 may circulate between the contact mechanism 110 and the power transmission mechanism 102 in response to the rotation of the power transmission mechanism 102. In that way, the object 110 may be machined with the moving machining belt 104.

In an embodiment, the circular machining belt 104 may be looped over a contact roller 126 at the tip of the contact arm 220 and a power transmission roller 200 for causing the circular machining belt 104 to move over the contact roller 126 and power transmission roller 200 in response to the rotation of the power transmission shaft 202. Thus the transmission roller 200 supplies kinetic energy to the machining belt 104. The contact roller 126, in turn, rolls with the machining belt 104 with low friction.

The length of the contact arm 220 should be a little too short for mounting the machining belt 104 and thus the machining belt 104 may remain slightly loose without separate tensioning.

The tightening may be performed by the tightening mechanism 106 which may press sections 120, 122 of the circular machining belt 104 between the contact mechanism 108 and power transmission mechanism 102 towards each other. The fact that the length of the contact arm 220 does not need to be changed for tightening enables working with good accuracy and without breaks.

In an embodiment, the tightening mechanism 106 may comprise at least one spring structure 210 and at least one spring roller 130. One end of the spring structure 210 may be coupled with the spring roller 130 and the other end may be fixed to an immobile part of the machining tool 100. The fixing point of the other end of the spring structure 210 may be near the power transmission mechanism 102 and the transmission shaft 200. The spring structure 210 may comprise or be similar to a leaf spring or a wire spring, for example. The spring structure 210 may comprise a coil spring, too. The curve or the coil of the spring structure 210 may twist partly of fully around the transmission shaft 200. The tightening mechanism 106 may be released for changing the machining belt 104. The tightening mechanism 106 may be easily released. The tightening mechanism 106 may be released by loosening a screw 280 attaching the spring roller 130. Also the screw 276 may be released.

In an embodiment, the tightening mechanism 106 may have a spring shaft 128, and the spring roller 130 may be coupled with the spring shaft 128 of the tightening mechanism 106 for enabling rotation of the spring roller 130 round the spring shaft 128 with the speed of the machining belt 104 during pressing against the machining belt 104. Between the spring shaft 128 and the spring roller 130 there may be a bearing. The spring structure 210 causes a spring force towards the machining belt 104 and that is why the spring roller 130 presses against the machining belt 104 with the spring force which results in a proper tensioning of the machining belt 104.

In an embodiment, the tightening mechanism 106 may have a single spring roller 130 which presses against one section 120 or 122 of the circular machining belt 104 between the contact roller 126 and power transmission roller 200 towards another. In such a case, one section 120 (alternatively 122) moves towards second section 122 (alternatively 120) because of the pressure while the second section 122 (alternatively 120) is static in that respect. However, the machining belt 104 may be rotating round the contact mechanism 108 and the power transmission mechanism 102.

Figure 2:
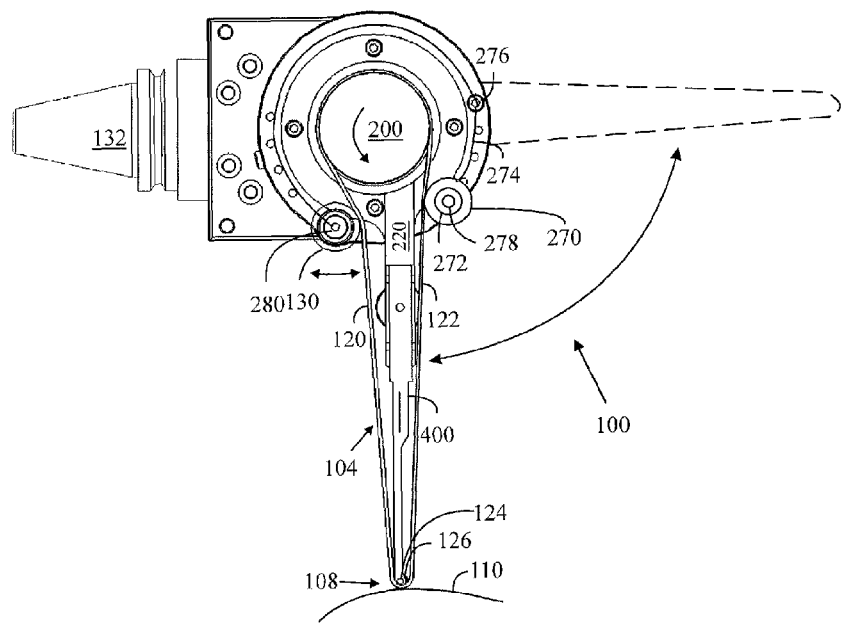
FIG. 2, shows an example of a tightening mechanism comprising more than one spring roller and turnable direction of an arm.

In an embodiment shown in FIG. 2, the tightening mechanism 106 may comprise more than one spring roller 130, 270 which may press both circular machining belt sections 120, 122 facing one another between the contact roller 126 and power transmission roller 200 towards each other. The tightening mechanism 106 may have a spring roller 270, a shaft 272, a spring structure 274 and a fixing screw 278 of its own.

By tightening the machining belt 104 with the tightening mechanism 106 the distance between the contact mechanism 108 and the power transmission mechanism 102 does not need to be changed. That is an advantage for a robotic machining, for example, because any change in the location of the contact mechanism 108 which is the machining head causes problems in controlling the machining process. With tensioning mechanism 106 the location of the contact surface for machining the object 110 can be kept static. All in all, because the belt stretch take-up is eliminated by the tightening mechanism 106 instead of an adjustment of the contact arm 220, the result is a precise and unchanged front contact roller 126 position which results in better controllability and end result.

In an embodiment, the spring roller 130 may have a rotational axis at least approximately parallel to the contact roller 126 and the power transmission roller 200. With the parallel rotational axes the use of the machining belt 104 is easy.

In an embodiment, the contact mechanism 108 may comprise a contact roller shaft 124 and a contact roller 126 such that the contact roller 126 rolls round the contact roller shaft 124. During operation of the machining tool 100, the movement of the machining belt 104 causes the contact roller 126 to roll.

Figure 3:
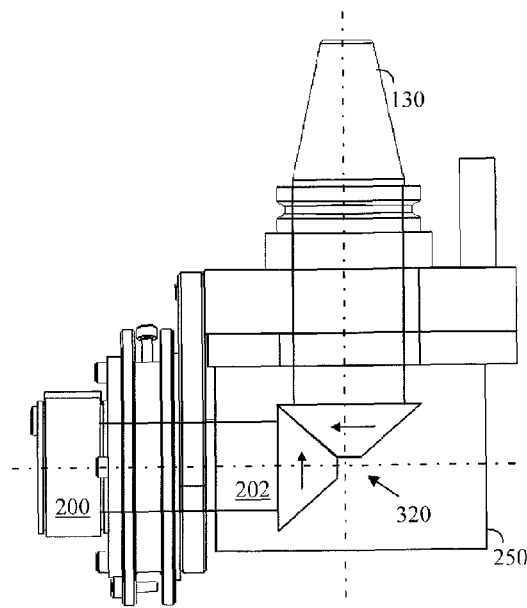
FIG. 3 shows an example of the machining tool from a back side with a view of an example of a gear inside the machining tool.

FIG. 3 presents a direct side view of the machining tool 100 from a different angle of view with respect to FIG. 1A. In an embodiment, the power transmission mechanism 102 may comprise a power transmission roller 200 and a power transmission shaft 202. In an embodiment, the power transmission roller 200 is connected with the power transmission shaft 202 for enabling rotation of the power transmission roller 200 with the power transmission shaft 202.

The power transmission shaft 202 has a mechanical connection 320 with the connecting part 132 for rotating the power transmission shaft 202. The mechanical connection 320 between the transmission shaft 202 and the connecting part 132 may be realized with a gear. The gear may comprise toothed wheels at least two of them being engaged with one another. The gear may be used for changing or varying the rotational velocity between the toothed wheels and thus also between the connecting part 132 and the transmission shaft 202. The change in velocity finally has effect also on the velocity of the transmission roller 200 and the machining belt 104. Alternatively or additionally the direction of the rotation may be changed. An example of the gear is a bevel gear or the like, which turns the rotational axis by 90°. The connecting part 132 may rotate 1 rpm to 5000 rpm (rpm=rotations per minute), for example. The transmission roller 200 may rotate 1 rpm to 15000 rpm, for example. A possible rotation for the connecting part 132 and the transmission roller 200 may be 3000 rpm. In an embodiment, the gear ratio may be 1:1, for example, but the ratio may also be different. The machining belt 104 may then move 1 m/min to 2000 m/min, for example.

In an embodiment, the connecting part 132 may have a connection with the rotational power source 112 using a spindle connection. The spindle connection may be based on an industrial standard tool taper interface such as HSK63-F or ISO30. The spindle connection may also be called a gear connection. The spindle connection may be used also during storage of the machine tool 100.

In an embodiment, the machining tool 100 may be repeatedly and releasably connectable with the rotational power source 112 such that the connecting part 132 is mechanically connected to and released from a counterpart of the rotational power source 112. The spindle connection is suitable for repeatable connection and disconnection. With the mechanical connection such as spindle connection there is no need to connect and disconnect electrical wires or air pipes to the machining tool 100.

In an embodiment, the machining tool 100 may comprise a casing 250 which may also be a supporting structure. One end of the spring structure 210, 274 may directly or indirectly be fixed to the casing 250 for applying the spring force to the machining belt 104 in order to tighten it. The fixing to the casing 250 may be performed by a screw 276 or the like, for example.

Figure 4:
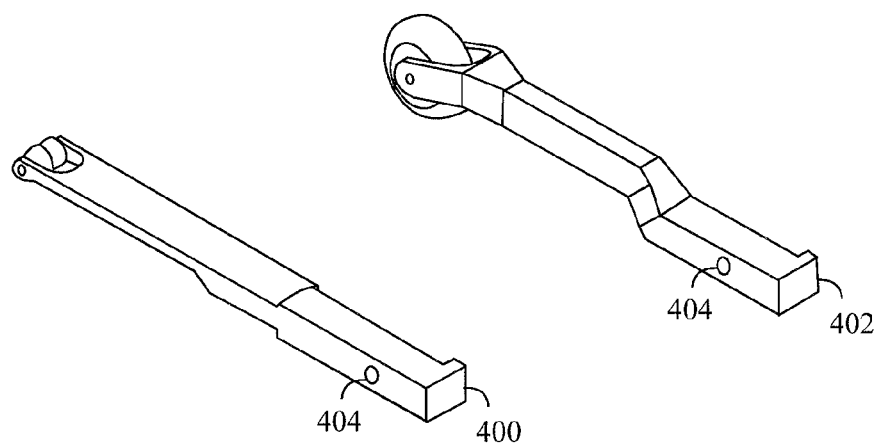
FIG. 4 shows examples of contact arms.

In an embodiment shown in FIG. 4, the machining tool 100 may have a set of contact arm pieces 400, 402. One contact arm piece 400, 402 may be selected for use between the contact roller shaft 126 and the power transmission shaft 200. The length of the contact arm 220 with each contact arm piece 400, 402 may be set when a tightening screw 404 is loosened. After a proper length is set the screw 404 may be tightened such that the length remains unchanged. The contact arms 400, 402 may include straight arms, angled arms, shoe-shine style arms, for example.

As FIG. 2 shows the direction of the arm 220, 400 may be turned in an embodiment. The arm which is turned by 180° with respect to the rotational axis 350 of the connecting part 132 is shown with a dashed line. The arm 220, 400 may be turned from an angle α of 90° to an angle of 180° or even to an angle of −90°, for example. The turning may be performed continuously or discretely. The discrete turning may be performed with 15° steps, for example.

It will be obvious to a person skilled in the art that, as technology advances, the inventive concept can be implemented in various ways. The invention and its embodiments are not limited to the examples described above but may vary within the scope of the claims.

What is claimed is:

1. A machining tool, wherein the robotic machining tool comprises a power transmission mechanism, a circular machining belt, a tightening mechanism and a contact mechanism for tool contact with an object to be machined;
   the power transmission mechanism of the machining tool is configured to have a mechanical connection through a connection part with a rotational power source;
   the contact mechanism and the power transmission mechanism have a desired distance therebetween such that a contact roller of the contact mechanism and a power transmission roller of the power transmission mechanism have a contact arm of a desired length therebetween, a length of the contact arm needing no change for tightening;
   the circular machining belt comprising a plurality sections is looped around the contact roller and the power transmission roller for causing the circular machining belt to move between the contact roller and the power transmission roller in response to the rotation of the power transmission mechanism for machining the object, wherein opposing sections of the belt between the contact roller and the power transmission roller are separated by a distance; and
   the tightening mechanism comprises at least one spring structure and at least one spring roller for pressing sections of the circular machining belt between the contact mechanism and power transmission mechanism with a spring force to adjust the distance for tensioning the machining belt, wherein the spring structure is curved and extends at least partly around the outside of the power transmission roller.

2. The machining tool as claimed in claim 1, wherein
   the contact mechanism comprises a contact roller and a contact roller shaft;
   the power transmission shaft is configured to have a mechanical gear connection with a rotational power source for rotating the power transmission shaft;
   the contact roller is connected to the contact roller shaft for enabling rotation of the contact roller around the contact roller shaft;
   the power transmission roller is connected with the power transmission shaft for enabling rotation of the power transmission roller with the power transmission shaft;
   the circular machining belt is looped over the contact roller and the power transmission roller for causing the circular machining belt to move over the contact roller and power transmission roller in response to the rotation of the power transmission shaft; and
   the tightening mechanism is configured to press sections of the circular machining belt between the contact roller and power transmission roller by the at least one spring roller to adjust the distance.

3. The machining tool as claimed in claim 1, wherein the machining tool is releasably connectable with the rotational power source.

4. The machining tool as claimed in claim 1, wherein the power transmission mechanism is configured to have a connection with the rotational power source using a spindle connection.

5. The machining tool as claimed in claim 2, wherein the tightening mechanism is configured to press one section of the circular machining belt between the contact roller and power transmission roller towards another section by a spring roller.

6. The machining tool as claimed in claim 2, wherein the tightening mechanism has a spring shaft, and the spring roller is connected with the spring shaft of the tightening mechanism for enabling rotation of the spring roller around the spring shaft with the speed of the machining belt during pressing the machining belt.

7. The machining tool as claimed in claim 2, wherein the tightening mechanism is configured to press opposing sections of the circular machining belt between the contact roller and power transmission roller by two spring rollers applied to different sections of the machining belt to adjust the distance.

8. The machining tool as claimed in claim 2, wherein the spring roller has a rotational axis at least approximately parallel to the contact roller and the power transmission roller.

9. The machining tool as claimed in claim 2, wherein the machining tool has a set of contact arm pieces, each contact arm piece being selectable for adjustable pivotal connection to the contact arm between the contact roller shaft and the power transmission shaft.

10. The machining tool as claimed in claim 2, wherein the machining tool comprises a mechanical connection which connects the power transmission roller and the connection part.

11. The machining tool as claimed in claim 10, wherein the connection part comprises a gear for changing or varying the velocity of the machining belt with respect to the rotation speed of the connection part.

\* \* \* \* \*